Sept. 4, 1928.  
V. HUGHES  
SPEEDOMETER DRIVE  
Filed May 29, 1926
1,683,036
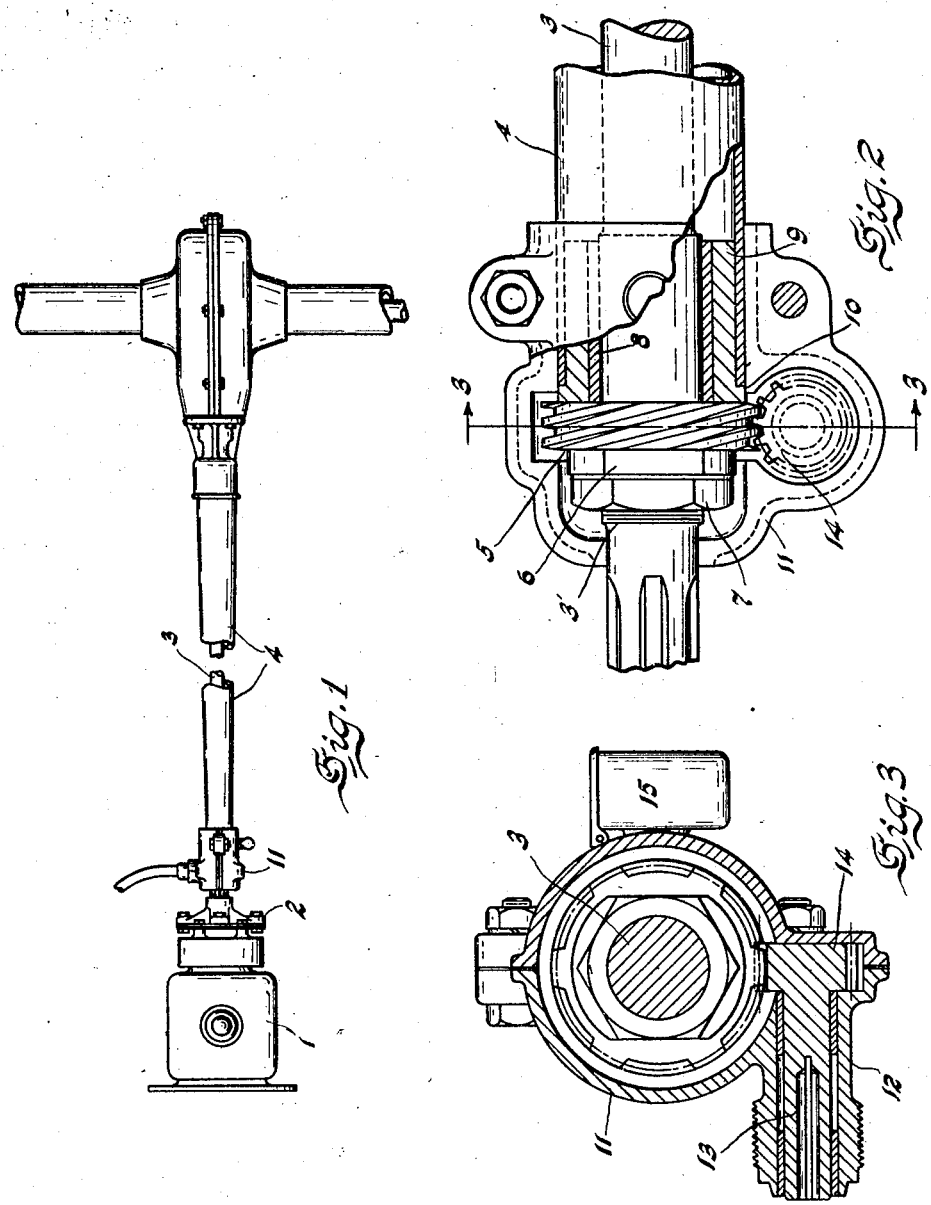
Inventor  
Victor Hughes Patented Sept. 4, 1928.

1,683,036

UNITED STATES PATENT OFFICE.

VICTOR HUGHES, OF DETROIT, MICHIGAN, ASSIGNOR TO GENERAL MOTORS RESEARCH CORPORATION, OF DETROIT, MICHIGAN, A CORPORATION OF DELAWARE.

SPEEDOMETER DRIVE.

Application filed May 29, 1926. Serial No. 112,628.

This invention relates to drive means for speedometers, and more particularly to that type of mechanism which transmits the revolution of the propeller shaft of a vehicle to a distantly located indicator.

The invention is shown and described as applied particularly to automobiles, but it is to be understood that there is no intention to limit the invention to this specific application, and it is obvious that it is equally usable in connection with other forms of traveling vehicles, particularly railway cars, tractors and the like.

The object of the invention is to provide a cheap, simple but efficient mechanism which will be easy to assemble, positive in operation, and unlikely to get out of repair.

In the drawings,

Fig. 1 is a top plan view of a conventional transmission drive shaft of an automobile showing the relation of the present speedometer driving mechanism to the drive shaft;

Fig. 2 is a side elevation partly in section of the speedometer driving mechanism; and Fig. 3 is a transverse section thereof taken on line 3—3 of Fig. 2.

Like parts are indicated by similar characters of reference throughout the several views.

Referring to the drawings, 1 represents the transmission housing and 2 is the customary universal joint, coupling the propeller or drive shaft 3 with the source of power. The drive shaft 3 revolves within the housing or torque tube 4 and leads to the rear axle, transmitting the propelling power thereto.

The drive shaft has an enlarged portion 3' which is screw threaded at one end. Onto this screw threaded portion 3' is threaded the gear 5, which in this instance is shown as a helical worm gear. The gear 5 is provided with a lateral extension 6 flattened on opposite sides to afford an engagement surface for a wrench. A lock nut 7 is shown which secures the threaded worm gear to the drive shaft 3 and insures its rotation therewith. The remaining portion of the enlargement 3' is devoid of threads, affording a smooth bearing surface for the bearing sleeve 8. A spacer sleeve 9 is inserted between the bearing sleeve and the torque tube to maintain the drive shaft and tube in spaced relation. The spacer 9 is provided with an end flange 10 which abuts against the end of the torque tube to hold the spacer and bearing in place.

The housing or case 11, separable into two halves, is clamped about the end of the torque tube in any suitable manner,—in this instance each half having formed thereon ears or lugs and bolted one to another. A hollow stud 12 projects laterally from the bottom of this housing, and located therein in suitable bearings is a trunnion shaft 13 with the gear 14 formed at one end to mesh with the worm gear 5. The opposite end of the trunnion shaft 13 is recessed for keyed engagement of a finger or pencil (not shown) on the end of a flexible shaft leading to the conventional indicator or speedometer on the dash board. The indicator and connection not forming a part of the invention have not been illustrated.

To provide proper lubrication of the drive shaft an oil cup 15 has been shown at the side of the housing in Fig. 3. The particular form of oil cup to be employed is nonessential.

As the vehicle is put into motion and the drive shaft revolves it carries with it the worm gear 5, which meshes with the gear 14, in turn actuating its integral trunnion shaft and the attached speedometer drive shaft, thereby transmitting the drive shaft revolutions to the distantly located indicator on the automobile dash board.

While in the past speedometers have been operated to indicate the drive shaft revolutions, and devices of this general type have become quite common, yet the present invention embodies unique features of compactness and affords a thoroughly practical device at a comparatively small cost. The invention is directed primarily at simplicity, ease of assembly, and economy of manufacture.

It is to be noted that the separable housing 11, when clamped in place, besides being a protective encasement for the worm gear, also houses the driven gear, holds the respective parts together, closes off the torque tube to the entrance of dirt and foreign matter, and forms a bearing for the end of the torque tube.

It will be understood that the invention is not to be limited to the exact construction shown, but that various modifications may be used without departing from the spirit or scope of the invention, as set forth in the following claims.

Having thus described my invention, I claim:

1. Speedometer actuating means on the transmission shaft of an automobile, including a helical worm gear having a lateral extension with flat sides to permit engagement of an adjusting wrench, screw threads on the interior of the gear for adjustable engagement with a screw threaded portion of the shaft, and a lock nut on the shaft for maintaining the gear in its adjusted position, a second gear meshing with the worm gear, and a distantly located indicator connected to the second gear.

2. In a motor vehicle, the combination with a drive shaft torque tube, a spacer member at the end of the tube, a drive shaft extending thru the tube, having an enlargement thereon, a portion of which is smooth and has bearing in the spacer member, and another portion of which is screw threaded and extends beyond the spacer member, of speedometer actuating means adapted for attachment as an accessory including a driving gear element interiorly threaded for engagement with the threads on said shaft, a housing separable into two portions and means to clamp said portions about the end of the torque tube with parts thereof extending beyond the end of the tube and enclosing said driving gear element, and a driven gear element having a bearing in one of said portions and housed therein, the axial clamping position of said housing on the torque tube serving to locate said gear elements in proper intermeshing driving relation.

3. In a motor vehicle, the combination with a drive shaft, a torque tube surrounding the shaft and a bearing for the shaft at the end of the tube, of speedometer actuating means adapted for attachment as an accessory, including a driving element adapted for threaded engagement on the shaft beyond the end of the torque tube, a housing for enclosing said driving element, arranged to be clamped about the periphery of the torque tube adjacent the end thereof and a driven element carried by the housing and placed in proper driving relation with the driving element by the proper positioning of the housing axially of the torque tube.

4. In a motor vehicle, the combination with a drive shaft having a screw threaded portion thereon and a torque tube surrounding the shaft, of speedometer actuating means adapted for attachment as an accessory including a driving element having screw threaded engagement on the shaft and being provided with portions for the engagement of an adjusting tool, means to lock said element in its adjusted position, a driven element, and mounting means for the driven element secured on the tube and adjustable axially thereof to bring the driven element into driving relation with the driving element in its locked position of adjustment.

In testimony whereof I affix my signature.

VICTOR HUGHES.